Jan. 12, 1926.
E. L. TIRRELL
1,569,686
DERRICK
Filed Nov. 16, 1923  3 Sheets-Sheet 2
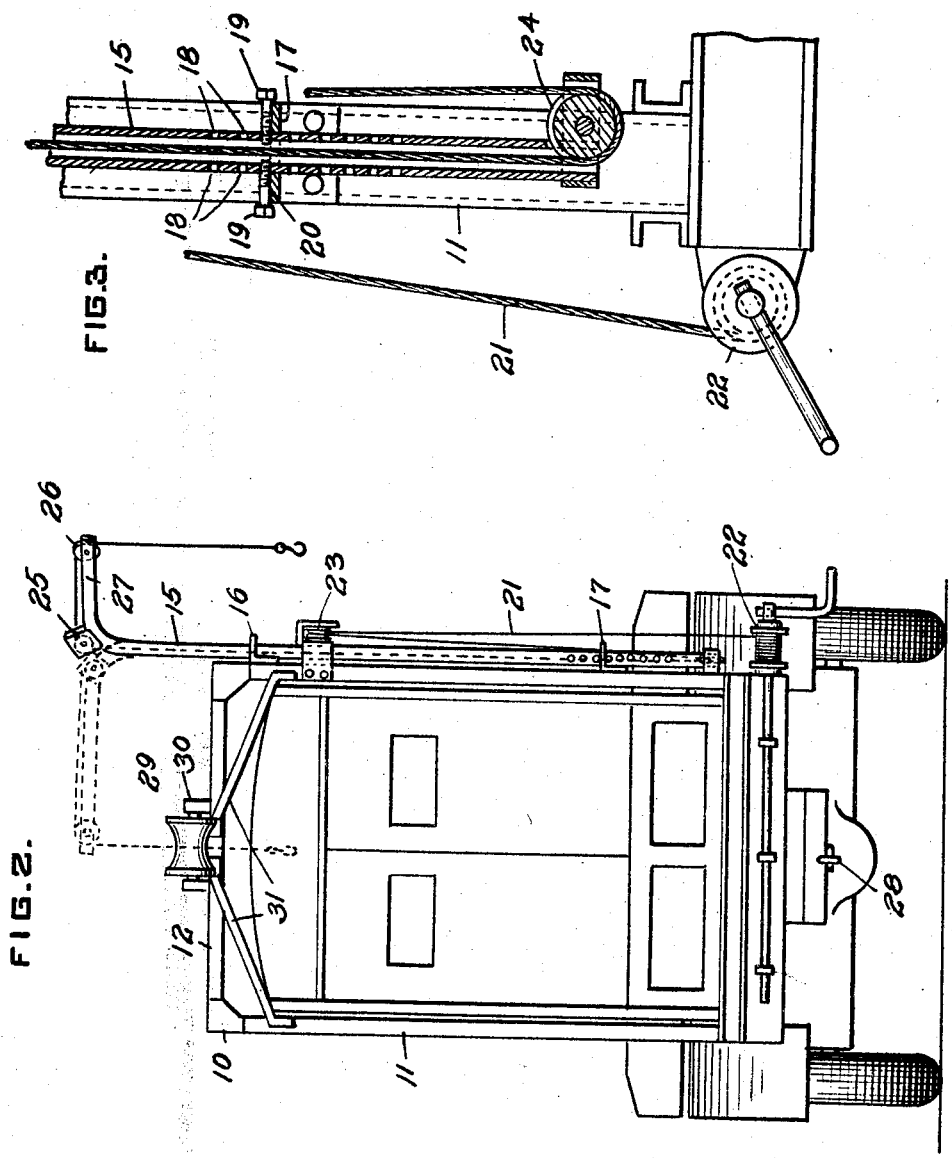
INVENTOR
Edward Leo Tirrell
By Green & McCallister
His Attorneys Jan. 12, 1926.
E. L. TIRRELL
1,569,686
DERRICK
Filed Nov. 16, 1923  3 Sheets-Sheet 3
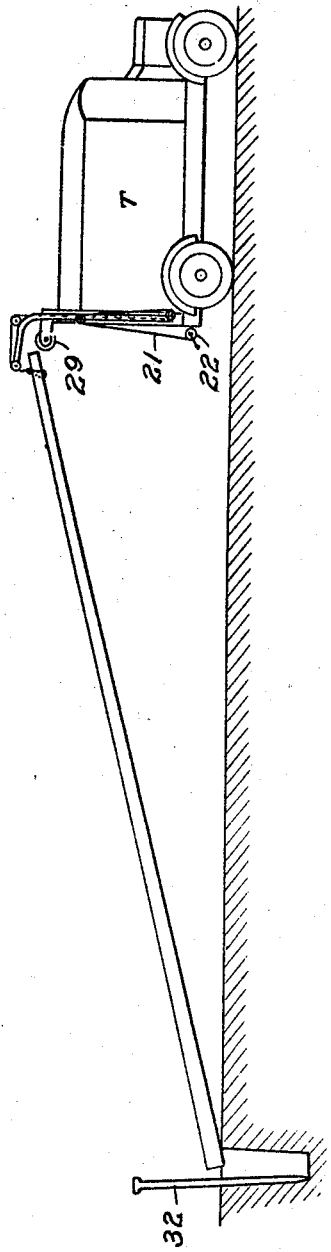
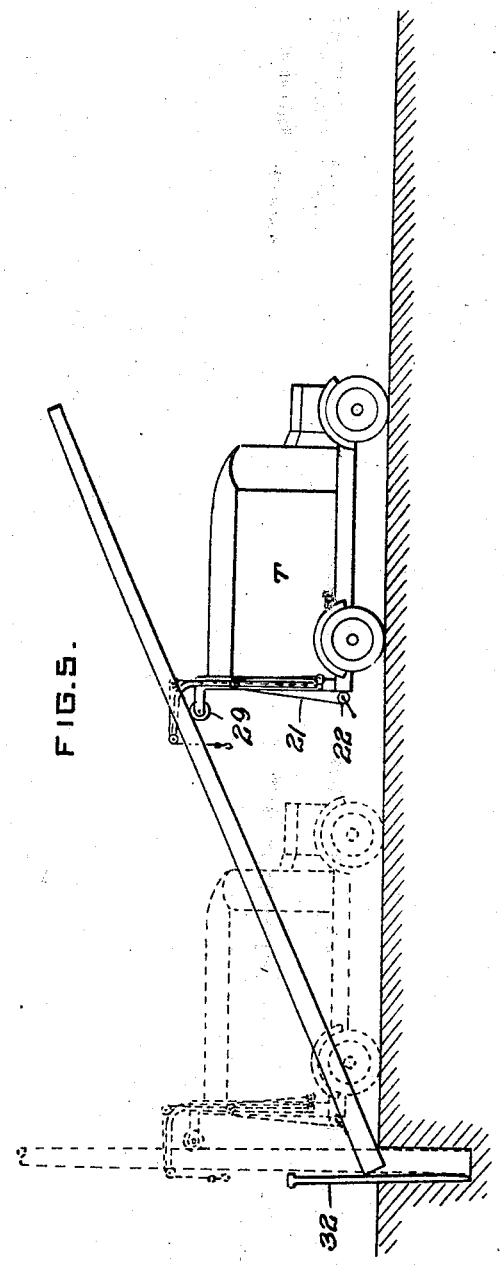
INVENTOR
Edward Leo Tirrell
By Green & McCallister
His Attorneys Patented Jan. 12, 1926.

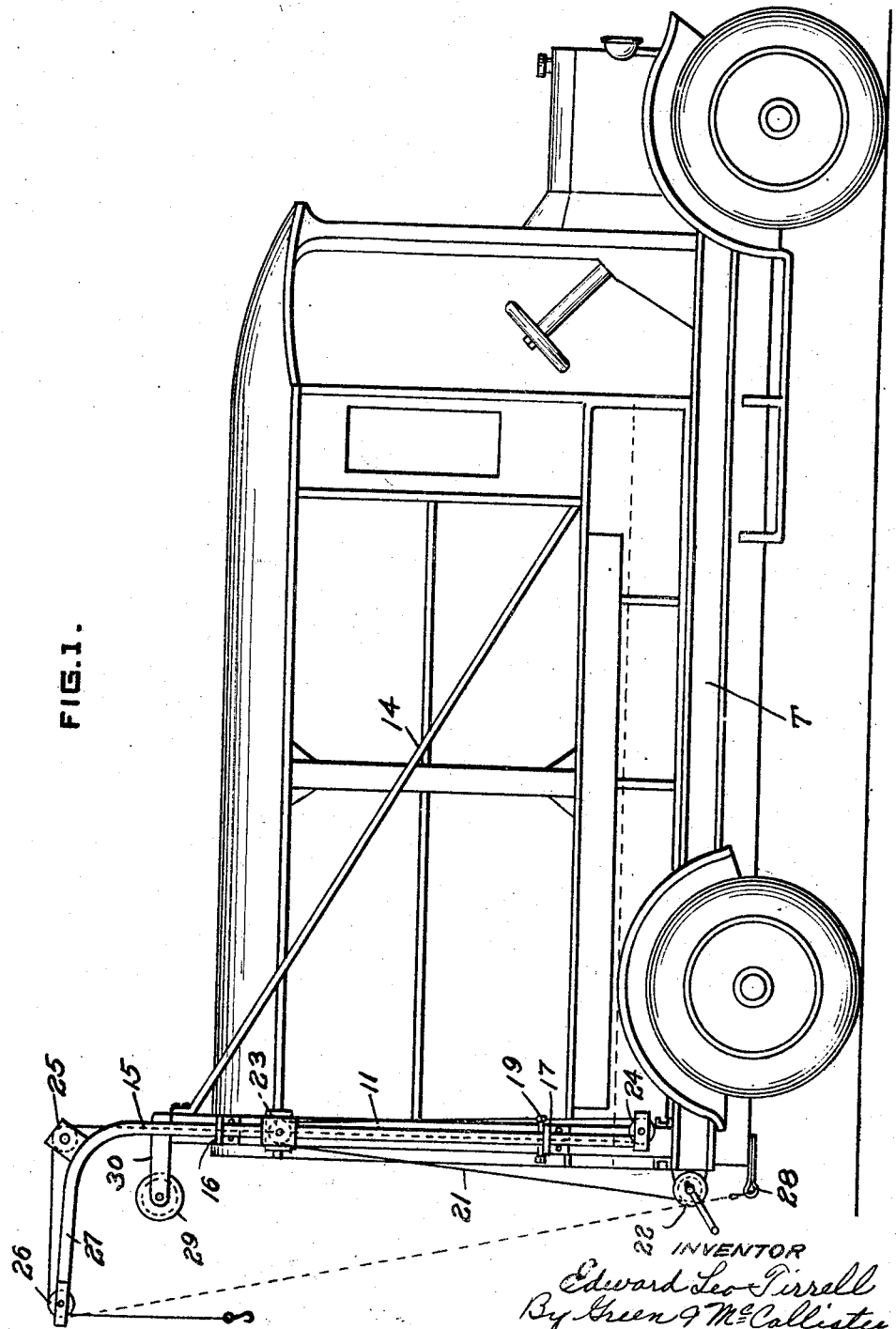

1,569,686

UNITED STATES PATENT OFFICE.

EDWARD LEO TIRRELL, OF PHILLIPSBURG, NEW JERSEY.

DERRICK.

Application filed November 16, 1923. Serial No. 675,075.

*To all whom it may concern:*

Be it known that I, EDWARD LEO TIRRELL, a citizen of the United States, and a resident of Phillipsburg, in the county of Warren and the State of New Jersey, have made a new and useful Invention in Derricks, of which the following is a specification.

This invention relates to derricks and more particularly to portable derricks such as are adapted to be mounted on motor trucks or other types of vehicles.

An object of this invention is to provide a derrick of this type which may be used for various purposes and which is also provided with a means which may be employed to advantage in erecting such objects as telephone or telegraph poles.

A further object is to provide a simple, rugged derrick which may be mounted upon the body of a motor truck or any movable vehicle without in any way interfering with the ordinary use thereof.

A still further object is to provide an improved association of derrick and vehicle frame such that movements of the vehicle may be utilized in erecting a telegraph pole or like object.

These and other objects, which will be apparent to those skilled in the art, I attain by means of my invention, one embodiment of which is herein described and illustrated in the accompanying drawings, in which Figure 1 is a side elevation of a motor truck equipped with my invention. Fig. 2 is an end elevation of the apparatus shown in Fig. 1, Fig. 3 is a view partly in section, illustrating a detail of my invention, and Figs. 4 and 5 are views illustrating the operation of apparatus embodying my invention in use in erecting a telegraph pole.

The illustrated embodiment of my invention includes a frame which is adapted to be rigidly mounted on a vehicle such as a motor truck, but which is so arranged that it does not interfere with the normal use of the vehicle. A vertically adjustable lifting boom having a rigidly attached but horizontally swinging arm is journaled on the frame in such relation to a guiding roller that the boom and its associated lifting devices may be employed in connection with the guiding roller in erecting unwieldy objects such as telegraph poles.

In the illustrated embodiment of the invention I have shown a motor truck generally indicated by the reference letter T which may be of the usual design except that it is provided with a rectangular superstructure in the form of a frame 10. The frame includes vertical side members 11 and a cross top member 12 which is secured to the vertical members 11 at the rear of the truck. The frame 10 is preferably provided with braces 14 extending forwardly along the sides of the vehicle body, as illustrated. A hollow boom 15 is slidably mounted in brackets 16 and 17 which are rigidly secured to one of the side members 11 located at the rear of the truck.

The hollow boom 15 is provided with a series of diametrically opposed holes 18 which are adapted to receive supporting bolts 19. The bolts 19 are adapted to contact with the top of the lower bracket 17 and thus rotatably support the boom 15 thereon. By inserting the supporting bolts through different holes the boom 15 may be supported at different heights. Obviously a single supporting bolt may be used instead of the two bolts illustrated. It is desirable to provide a wear plate 20 on the top of the bracket 17 for directly supporting the bolts 19. A lifting rope 21, which is operated by a windlass 22, passes over a pulley 23 mounted at the upper part of the frame 10, thence downwardly around a pulley 24 which is mounted at the lower end of the boom 15. From the pulley 24 the rope passes upwardly through the hollow boom 15 and over pulleys 25 and 26 which are supported on the horizontally extending arm 27 of the boom 15. A hook 28, secured to the vehicle, is adapted to receive the free end of the lifting rope 21. It will be obvious that when the rope 21 is so secured rotation of the windlass will operate to raise the boom 15 and the boom may be maintained in its adjusted position by inserting the supporting bolts 19 through the proper holes.

A grooved roller 29 is mounted in outwardly extending bearings 30 which are rigidly secured to the cross member 12 of the frame 10. Braces 31 are preferably provided to aid in supporting the roller 29.

When it is desired to use my invention for erecting such objects as telegraph or telephone poles the pole is first laid prone on the ground with its base over the hole which has been provided therefor. The outer end is raised by means of the boom 15, lifting rope 21 and windlass 22 as shown in Fig. 4. When in the proper inclined position the vehicle is moved a sufficient distance to cause the upper end of the inclined pole to rest on the roller 29. The length of the horizontal arm 27 of the boom is such that movement of the vehicle causes the arm to swing horizontally inward and place the upper end of the pole on the roller 29. With the outer end of the pole supported by the roller the lifting rope is unfastened from the pole and by moving the vehicle toward the hole provided to receive the pole the latter rides up on the roller 29 and is erected into a vertical position, as shown in Fig. 5. It is desirable to provide a stake 32 or some similar means to prevent the bottom of the pole sliding over the hole.

Obviously any desired form of lifting means may be employed for the purpose of cooperating with the roller 29 in erecting poles and the like. The particular features of the above described derrick are claimed in my divisional application, Serial Number 71,918, filed November 28, 1925.

It will be obvious to those skilled in the art that my invention may not only be used for the erecting of telegraph poles but that it is adapted to all the uses of a portable derrick and that it may be mounted upon a vehicle without in any way interfering with the normal use thereof.

Having described one embodiment of my invention what I claim as new and desire to secure by Letters Patent is:

1. In combination with a vehicle, a frame mounted at one end thereof, a movable lifting boom mounted on said frame and provided with means for lifting a pole or the like from a prone to an inclined position and means mounted on said frame and adapted to engage a pole or the like held by said lifting means and to elevate the same on movement of said vehicle.

2. In combination with a vehicle, a frame mounted at one end thereof and provided with a horizontal cross-member, a movable lifting boom mounted on said frame and provided with means for lifting a pole or the like from a prone to an inclined position and a roller, rotatably mounted on the cross-member of said frame adapted to engage a pole or the like held by said means and to elevate the same on movement of said vehicle.

3. In combination with a vehicle, a frame mounted at one end thereof, a lifting means associated with said frame for lifting a pole or the like from a prone to an inclined position and means mounted on said frame and adapted to engage a pole or the like held by said lifting means and to elevate the same on movement of said vehicle.

4. In combination with a vehicle, a frame mounted at one end thereof and provided with a horizontal cross member, a movable lifting boom associated with said frame and provided with means for lifting a pole or the like from a prone to an inclined position, outwardly extending bearings on said cross member and a roller rotatably mounted in said bearings and adapted to engage a pole or the like held by said means and to elevate the same on movement of said vehicle.

In testimony whereof, I have hereunto subscribed my name this 14th day of November, 1923.

EDWARD LEO TIRRELL.